United States Patent Office 3,629,198
Patented Dec. 21, 1971

3,629,198
POLYOXADIAZOLES
Henry W. Steinmann, Sparta, N.J., assignor to Celanese Corporation, New York, N.Y.
No Drawing. Filed Oct. 6, 1969, Ser. No. 864,214
Int. Cl. C08g 33/04
U.S. Cl. 260—47 CP    14 Claims

ABSTRACT OF THE DISCLOSURE

Polymers represented by the formula:

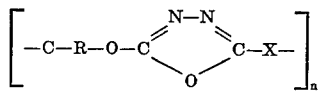

wherein R is alkylene or arylene, n is an integer, X is an oxadiazolyl radical attached through a ring carbon, or a covalent bond or a radical of the formula:

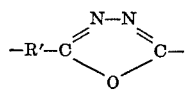

wherein R' is alkylene or arylene. Polymers of this class are characterized by good high temperature properties and they are thus of particular utility in polymer applications where heat stability is required. The invention provides new precursors which can be converted to the aforedescribed polymers.

---

This invention relates to the provision of a new class of polymeric materials which can be characterized as polyoxadiazoles. It relates further to new precursors which can be converted to said polyoxadiazoles and to the processes for preparing the new polyoxadiazoles and their precursors. More particularly, the present invention relates to the provision of polyoxadiazoles having a linear structure composed of recurring 2,5-(1,3,4-oxadiazolyl) oxygen and hydrocarbon moieties, said oxadiazole moieties having at least one ring carbon attached to an oxygen atom of the polymer backbone.

There is a present need for polymeric materials having good stability to ambient and high temperature conditions. There is a particular need for polymers which can be used as molding compositions and/or adhesives for structures which are to be exposed to relatively high temperatures. While polymers filling some needs have been previously prepared, developing technology continuously leads to polymer requirements not satisfied by a single existing material. It is therefore necessary to select the best material from the list of available ones. Since the chance of finding a suitable material for a specialized application increases with the number of available materials, it is desirable to have as many materials as possible. It is accordingly an object of this invention to provide a new class of polymers having distinctive properties rendering them useful as molding and adhesive compositions. Other objects of this invention will be apparent from the ensuing description thereof.

In accordance with the present invention, there are provided new polyoxadiazoles and new precursors therefor and new processes for preparing these materials. The polyoxadiazole compositions of the present invention are characterized by good heat stability and are useful in the fabrication of articles which must withstand high temperatures without loss of their physical and chemical properties. These polymers have recurring 2,5-(1,3,4-oxadiazolyl (oxygen and hydrocarbon moieties and at least one carbon of the oxadiazole ring attached through an oxygen atom into the polymer backbone. They may be represented by the Formula I:

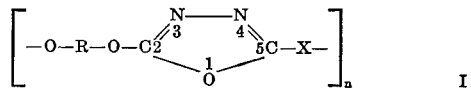

wherein R is an aliphatic, cycloaliphatic or an aromatic moiety; n is an integer, preferably greater than 10; and X is a covalent bond, a 2,5-(1,3,4-oxadiazolyl) moiety or the radical of the Formula II:

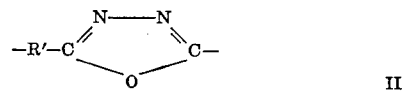

wherein R' is an aliphatic, cycloaliphatic or aromatic moiety.

The values of R and R' may be the same or different and they are determined by the reactants selected for use in preparing the new precursors of this invention. There are several methods of preparing the polyoxadiazoles from these precursors and the selection of which of these methods to use depends upon the sub-class of polyoxadiazole which is desired. The polyoxadiazoles within the scope of Formula I may be divided into three types represented by the following Formulae Ia, Ib and Ic:

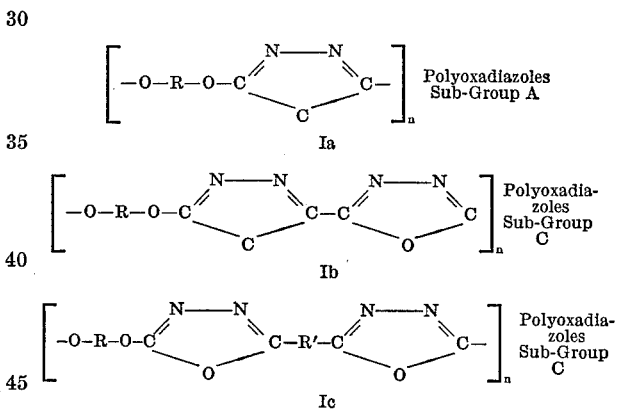

wherein R, R' and n are as defined above. The structure of the precursor used in the preparation of the polyoxadiazoles determines the structure of polyoxadiazole product. The precursor polymers are represented by the following Formula III:

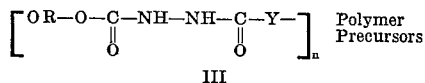

wherein R and n are as defined above, Y is a covalent bond, a hydrazido moiety or a radical represented by the Formula IV:

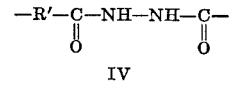

wherein R and R' are defined above.

Three sub-classes of precursor polymers can be found within the scope of Formula III. They are represented by the following Formulae IIIa, IIIb and IIIc, and are respectively employed to prepare the polyoxadiazoles represented by Formulae Ia, Ib and Ic, above.

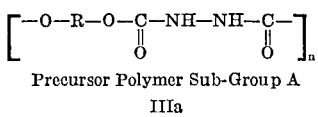

Precursor Polymer Sub-Group A
IIIa

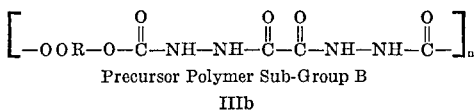

Precursor Polymer Sub-Group B
IIIb

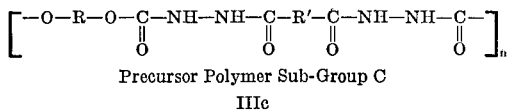

Precursor Polymer Sub-Group C
IIIc wherein $n$, R and R' are defined above.

The polyoxadiazoles of the present invention are produced by dehydrating the appropriate precursor polymer under conditions which result in ring closure and formation of an oxadiazole ring in the polymer chain. Dehydration can be effected by heating the precursor at an elevated temperature in the range of between about 150° C. and about 350° C., preferably between about 200° C. and about 300° C. Optionally, the heating can be conducted in the presence of a catalyst. The use of a catalyst enhances the reaction thereby making it possible to cyclize at lower temperatures. Suitable catalysts are the alkaline earth carbonates such as magnesium and calcium carbonate. The catalysts can be readily removed from the reaction product by washing with a dilute mineral acid such as dilute hydrochloric acid.

The precursors employed in the present invention can be prepared by alternative processes. Thus, to prepare the precursor represented by the Formula IIIa, a bis(chloroformate) can be reacted with a bis(N-aminocarbamate) or with hydrazine as shown in Equations A and B, under conditions which evolve hydrogen chloride:

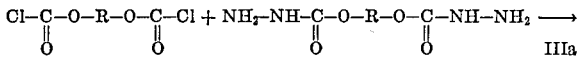

Equation A

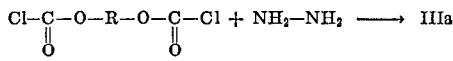

Equation B

The reactants are dispersed in an inert solvent and the resultant mixture is maintained at a temperature of between about 0° and 100° C. After the evolution of hydrogen chloride substantially ceases, the product is recovered either by precipitation, as for example, by adding excess water to the solution, or by removing the solvent.

The precursor represented by Formula IIIb can be prepared by reacting a bis-chloroformate with oxalyl dihydrazide under conditions resulting in the evolution of hydrogen chloride, as shown by the following equation:

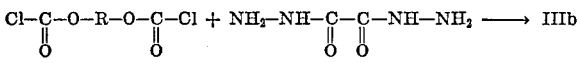

Equation C

Alternatively, the compounds of Formula IIIb can be prepared by reacting oxalyl chloride with a bis(N-aminocarbamate) under conditions leading to the evolution of hydrogen chloride, according to the following equation:

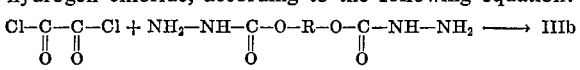

Equation D

These reactions are effected under the conditions set forth above for the preparation of the precursor represented by Formula IIIa.

The sub-class of precursors represented by Formula IIIc can be prepared by either one of two alternative methods. Thus, a bis-chloroformate can be reacted with a dihydrazide under conditions to evolve hydrogen chloride as shown by the following equation:

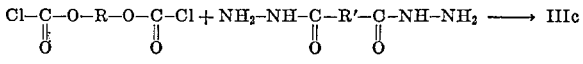

Equation E

Alternative, a bis(N-aminocarbamate) can be reacted with an acid chloride under conditions to evolve hydrogen chloride as shown by the following equation:

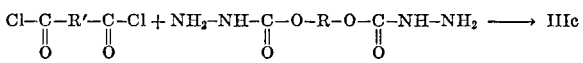

Equation F

The conditions employed are the same as those used to produce the precursor represented by Formula IIIa.

Suitable bis(chloroformates) which can be employed as reactants for the above described reaction include arylene bis(chloroformates) such as isophthaloyl chloride, terephthaloyl chloride, phthaloyl chloride, 1,2-naphthylene bis(chloroformate), 1,4-naphthylene bis(chloroformate), bisphenylene bis(chloroformate); and alkylene bis(chloroformates) such as methylenebis-(chloroformate) ethylene bis(chloroformate) octylene bis(chloroformate) and the like.

Suitable bis(N-amino-carbamates) which can be employed as reactants in the reactions described above include alkylene bis(N-aminocarbamates) such as ethylenebis(N - aminocarbamate), propylenebis(N - aminocarbamate), hexylenebis(N-aminocarbamate), octylenebis(N-aminocarbamate); and arylenebis(N-aminobamates) such as p-phenylenebis(N-aminocarbamate), m-phenylenebis (N-aminocarbamate), orthophenylene bis(N-aminocarbamate), benzophenone - 4,4'-bis(N-aminocarbamate), di-(p-phenylene)sulfone-bis(N-aminocarbamate) and the like.

Suitable dihydrazides which can be employed as reactants in the reactions described above include alkylenedihydrazides such as ethylenedihydrazide, propylenedihydrazide, octylenedihydrazide; and arylenedihydrazides such as p-phenylenedihydrazide, di(p-phenylene) sulfone dihydrazide, benzophenone-4,4'-bis-dihydrazide and the like.

In preparing the precursors of this invention, the reaction is effected in the presence of a solvent which is inert to both the product and the reactants. Suitable solvents which can be employed are dimethylacetamide, dimethylformamide, N-methylpyrrolidone and hexamethylphosphoramide. The reaction generally requires between about two and about eight hours to provide substantially complete conversion. The precursor may be recovered first by effecting precipitation as by adding excess water to the reaction mixture. The precipitate can then be purified as for example by washing with water and then with methanol, followed by drying.

The following examples are presented to further illustrate this invention.

EXAMPLE 1

Preparation of p-phenylene bis(N-aminocarbamate)

A weight of 64.0 grams (0.25 mole) of p-phenylenebis(ethyl carbonate) was dissolved in 25 ml. of methanol. This solution was added dropwise to a solution of 100 gms. of hydrazine hydrate (85% hydrazine, 2.66 moles). The mixture was then heated to reflux and maintained there with stirring for three hours. It was then slowly cooled and allowed to stand overnight. Needle-like crystals formed.

The p-phenylene bis(ethyl carbonate) was prepared by first dissolving 110 gms. (1.0 mole) of hydroquinone in 1000 ml. of pyridine and cooling the solution to 0° C. A weight of 220 gms. (2.02 moles) of ethyl chloroformate was then added dropwise to the agitated solution: Agitation was continued overnight as the temperature slowly increased to 20° C. The product was precipitated by adding the solution to excess water. It was washed thoroughly with water and dried at 60° C., in a vacuum oven. There were obtained 110 grams of a white solid. The crystals were collected and washed with water. They were then dried at 60° C. in a vacuum oven. There were obtained 14 gms. of p-phenylenebis-(ethylcarbonate) melting at 176–178° C.

EXAMPLE 2

Polymerization of p-phenylene bis(N-aminocarbamate) with isophthalyl chloride

A weight of 2.3 gms. (0.01 mole) of p-phenylene bis (N-aminocarbamate) was dissolved in 100 ml. of DMAc (dimethylacetamide). A weight of 3.0 gms. (0.024 mole) of melamine was dispersed in the solution to act as an acid acceptor. The resulting suspension was cooled in ice water and then 2.03 gms. (0.01 mole) of isophthaloyl chloride was added. The reaction mixture was stirred and the moderately exothermic reaction controlled by maintaining the ice bath around the reaction flask. The solution became viscous with increasing time. It was stirred overnight at a temperature below 20° C. The reaction mixture was added to excess water to precipitate the product which was collected, washed with water, washed with methanol and dried at 60° C. in a vacuum oven. The white precursor polymer weighed 1.6 gms. It melted at 325° C. and had an inherent viscosity of 0.26 dl./g. measured as a 0.1% solution in DMSO (dimethyl sulfoxide). The polymer was completely soluble in DMSO and partially soluble in DMAc.

The IR curve for the polymer showed a strong absorption band at 3.07 microns indicating presence of

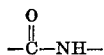

groups and 6.03 microns showing presence of carbonyl groups. There was no absorption at 10.3 microns which is the band characteristic of 1,3,4-oxadiazole.

EXAMPLE 3

Conversion of the polymer precursor of Example 2 to 1,3,4-oxadiazole polymer

One gram of the precursor polymer of Example 2 was placed in a small flask equipped with an outlet leading to a trap and then to a vacuum pump. The flask was flushed with dry nitrogen and the system evacuated to about 0.5 mm. Hg pressure with the vacuum pump. The flask was then immersed in an oil bath and the temperature raised to 200° C. After holding at this temperature for about 30 min., the temperature was then slowly increased to 250° C. over a period of 4 hours and it was then held at 250° C. for 1 hour. The color of the polymer turned from white to tan. Water droplets were observed in the outlet tubing. The polymer was collected, washed with water, washed with methanol and dried at 60° C. in a vacuum oven.

The polymer did not melt under 400° C. It was soluble in concentrated sulfuric acid. The IR spectra distinctly showed no amide band at 3.07 microns and no carbonyl band at 6.03 microns. The strong absorption band at 10.3 microns showed that 1,3,4-oxadiazole rings had formed.

What is claimed is:

1. Polyoxadiazoles consisting essentially of repeating units of the formula:

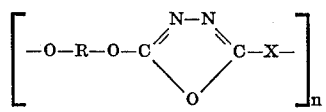

wherein R is alkylene of 1 to 8 carbons or arylene of one or two carbocyclic rings, X is an oxadiazolyl radical attached through a ring carbon atom, a covalent bond or a radical of the formula:

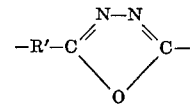

n is at least 10, and R' is alkylene of 1–8 carbons or arylene of one or two carbocyclic rings.

2. The polyoxadiazole of claim 1 wherein X is an oxadiazolyl radical.

3. The polyoxadiazole of claim 1 wherein X is the radical:

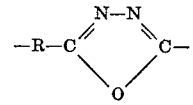

4. The polyoxadiazole of claim 1 wherein X is a covalent bond.

5. A polymer precursor consisting essentially of repeating units of the formula:

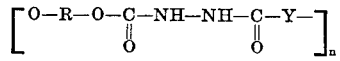

wherein R and n are as defined in claim 1 and Y is a covalent bond or a radical selected from the group consisting of:

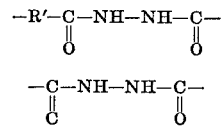

R' being as defined in claim 1.

6. The precursor polymer of claim 5 wherein Y is a covalent bond.

7. The polymer precursor of claim 5 wherein Y is the radical:

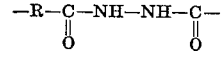

8. The polymer precursor of claim 5 wherein Y is the radical:

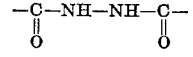

9. The process for making the polymer precursor of claim 6 which comprises reacting a bis(chloroformate) with hydrazine or a bis(N-aminocarbamate) in an inert solvent at from about 0 to about 100° C. to evolve hydrogen chloride; and collecting said precursor by precipitation.

10. The process for making the polymer precursor of claim 7 which comprises reacting a bis(chloroformate) with a dihydrazide in an inert solvent at from about 0 to 100° C. to evolve hydrogen chloride; and collecting said precursor by precipitation.

11. The process for making the polymer precursor of claim 7 which comprises reacting a bis(N-aminocarbamate) with an acid chloride in an inert solvent at from about 0 to 100° C. to evolve hydrogen chloride; and collecting said precursor by precipitation.

12. The process for making the polymer precursor of claim 8 which comprises reacting oxalyldihydrazide with a bis-(chloroformate) in an inert solvent at from about 0 to 100° C. to evolve hydrogen chloride; and collecting said precursor by precipitation.

13. The process for making the polymer precursor of claim 8 which comprises reacting oxalyl chloride with a bis(N-aminocarbamate) in an inert solvent at from about 0 to about 100° C. to evolve hydrogen chloride; and collecting said precursor by precipitation.

14. The process for making the polymer of claim 1 which comprises thermally cyclizing the polymer precursor of claim 5 by dehydration at temperatures between about 150° C. and 350° C. for up to about 5½ hours which lead to ring closure and formation of oxadiazole rings in the polymer chain.

References Cited

UNITED STATES PATENTS 3,130,182  4/1964  Frazer _____ 260—78
3,238,183  3/1966  Frazer _____ 260—78.4

WILLIAM H. SHORT, Primary Examiner

L. L. LEE, Assistant Examiner

U.S. Cl. X.R.

260—30.2, 30.6 R, 30.8 R, 30.8 DS, 32.6 N, 63 N, 77.5 B, 78 TF